United States Patent [19]

Haberkorn

[11] Patent Number: 5,181,815
[45] Date of Patent: Jan. 26, 1993

[54] COLLAPSIBLE STRUCTURE FOR UNITIZING AND BRACING A LOAD IN A TRAILER

[76] Inventor: Robert W. Haberkorn, 8100 W. 119th St., Palos Park, Ill. 60464

[21] Appl. No.: 607,819

[22] Filed: Nov. 1, 1990

[51] Int. Cl.⁵ .............................................. A47F 5/00
[52] U.S. Cl. ..................................... 410/140; 410/47; 410/129; 182/152; 211/189; 248/150; 248/165
[58] Field of Search ............... 211/189, 191, 192, 195, 211/201; 410/34, 32, 58, 127, 129, 121, 35, 46, 140–142, 144–148; 206/386, 600; 108/56.1, 64, 153, 154, 155; 105/363; 182/152, 151; 248/150, 165, 166

[56] References Cited

U.S. PATENT DOCUMENTS

| | | |
|---|---|---|
| 1,499,229 | 6/1924 | Laffey . |
| 1,969,656 | 8/1934 | Marlowe .................. 211/192 X |
| 2,166,918 | 7/1939 | McMullen et al. . |
| 2,204,075 | 6/1940 | Eisensmith .................. 410/140 |
| 2,226,570 | 12/1940 | McGaw ........................ 211/189 |
| 2,279,325 | 4/1942 | Kaldizar .................... 211/189 X |
| 2,514,466 | 7/1950 | Bildhauer . |
| 2,522,096 | 9/1950 | Cooke ..................... 211/189 X |
| 2,812,728 | 11/1957 | Reheis . |
| 2,819,688 | 1/1958 | Hall . |
| 2,895,431 | 7/1959 | Ford . |
| 2,895,619 | 7/1959 | Frazier ....................... 211/192 |
| 2,901,987 | 9/1959 | Campbell et al. ............. 410/145 |
| 2,937,767 | 5/1960 | Butler et al. ............... 211/191 |
| 2,944,676 | 7/1960 | Bell ........................ 211/191 |
| 2,978,993 | 4/1961 | Hall ........................ 410/129 |
| 3,183,855 | 5/1965 | Adler ....................... 410/140 |
| 3,235,038 | 2/1966 | Nesslinger ................ 211/195 X |
| 3,337,061 | 8/1967 | Caudell ................... 211/191 X |
| 3,365,073 | 1/1968 | Degener ..................... 211/192 |
| 3,463,325 | 8/1969 | Zagotta et al. ............. 211/191 |
| 3,606,842 | 9/1971 | Verbick .................... 410/127 X |
| 3,625,372 | 12/1971 | MacKenzie ................... 211/191 |
| 3,637,094 | 1/1972 | Grey ...................... 410/140 X |
| 3,647,080 | 3/1972 | Denny ........................ 211/191 |
| 3,651,950 | 3/1972 | Carter ....................... 211/189 |
| 3,685,665 | 8/1972 | Atwater ..................... 211/191 |
| 3,964,608 | 6/1976 | Rowley . |
| 4,030,612 | 6/1977 | Gray ........................ 211/192 |
| 4,074,812 | 2/1978 | Skubic et al. ............... 211/192 |
| 4,079,678 | 3/1978 | Champagne ................. 211/192 X |
| 4,127,071 | 11/1978 | Thomaswick .................. 410/32 |
| 4,189,250 | 2/1980 | Abbott et al. ............. 211/192 X |
| 4,261,470 | 4/1981 | Dolan ....................... 211/191 |
| 4,285,436 | 8/1981 | Konstant et al. ............. 211/192 |
| 4,360,298 | 11/1982 | Fischer et al. .............. 410/32 |
| 4,498,824 | 2/1985 | Kinkle . |
| 4,545,710 | 10/1985 | Hepp .................... 410/121 X |
| 4,708,252 | 11/1987 | Azzi ........................ 211/192 |
| 4,743,151 | 5/1988 | Haberkorn . |
| 5,012,938 | 5/1991 | King ........................ 211/191 |
| 5,037,256 | 8/1991 | Schroeder ................. 410/144 X |

FOREIGN PATENT DOCUMENTS

| | | | |
|---|---|---|---|
| 224853 | 12/1962 | Austria ..................... 211/191 |
| 580720 | 8/1959 | Canada ..................... 410/145 |
| 7311859 | 8/1973 | Netherlands ................ 211/201 |
| 818459 | 8/1959 | United Kingdom .............. 211/192 |
| 2142701 | 1/1985 | United Kingdom .............. 182/151 |

Primary Examiner—Michael S. Huppert
Assistant Examiner—Robert S. Katz
Attorney, Agent, or Firm—Wood, Phillips, Van Santen, Hoffman & Ertel

[57] ABSTRACT

A collapsible bracing structure for bracing a load against shifting a surface bearing the load, including a pair of upright side frames extending longitudinally of the load-bearing surface and a plurality of elongated cross-braces each having opposite ends and extending laterally to the side frames to retain the side frames in an upright position. Manually operable, rotatable latches are provided for releasably attaching the opposite ends of each of the elongated braces to each of the side frames to define a rigid block having a bottom surface engaging the surface bearing the load and at least one upright load-engaging face.

6 Claims, 4 Drawing Sheets

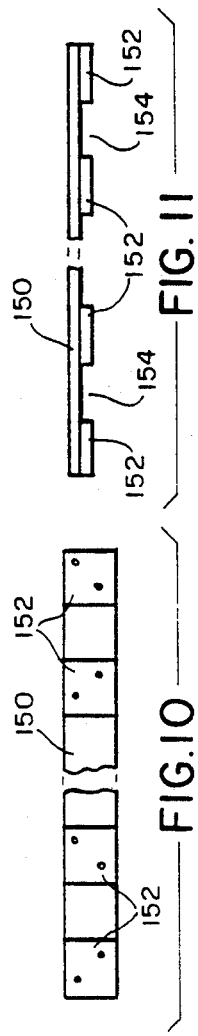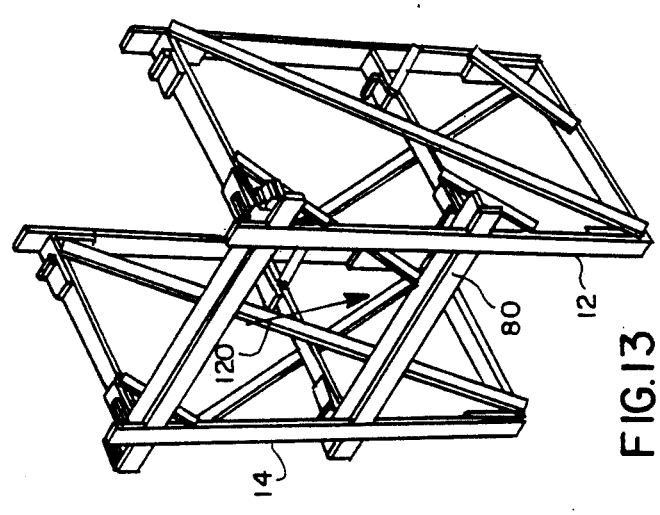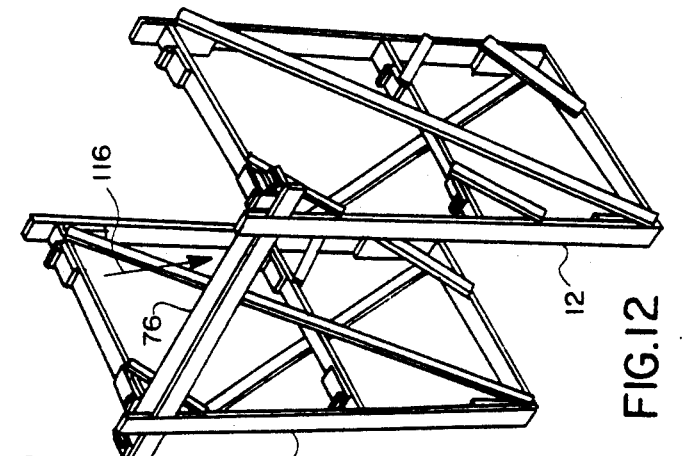

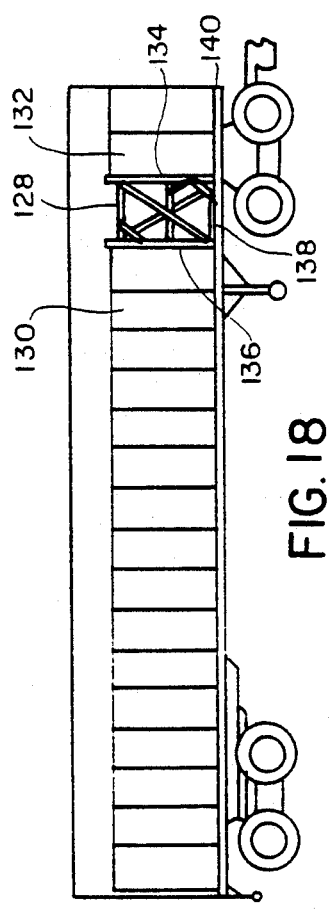
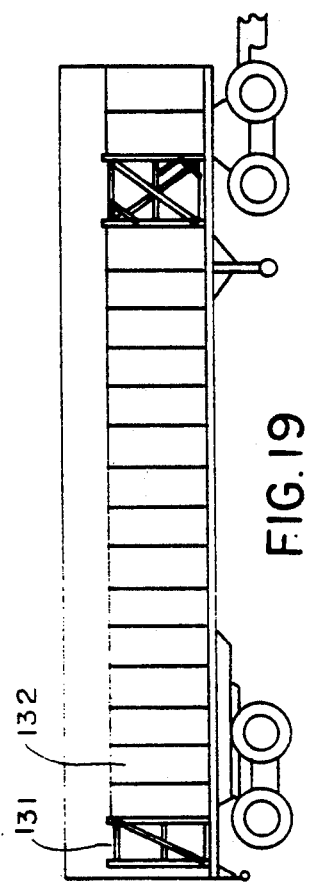
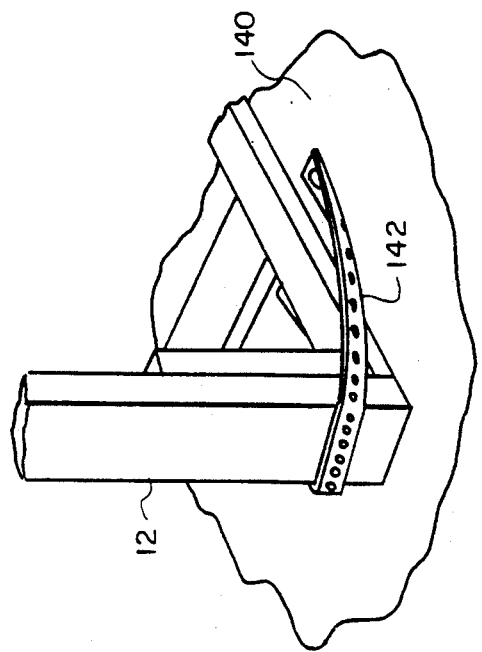
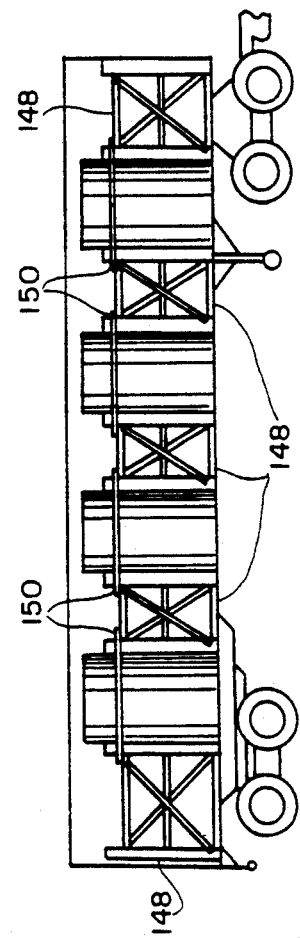
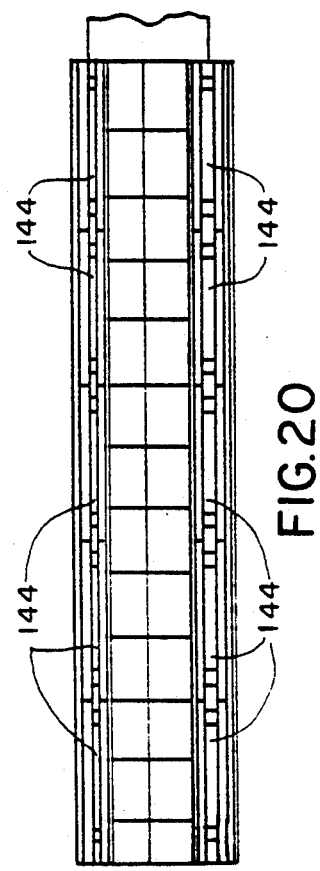

COLLAPSIBLE STRUCTURE FOR UNITIZING AND BRACING A LOAD IN A TRAILER

BACKGROUND OF THE INVENTION

1. Technical Field

The present invention is directed toward a structure and method for unitizing and bracing loads and, more particularly, toward a collapsible structure and method for unitizing and bracing loads in moving vehicles, such as truck trailers.

2. Background Art

The desirability for unitizing loads during transport is well-known. Glass items, including liquid containers, are particularly susceptible to breaking as a result of being bumped during transport. Further, shifting of massive payloads results in dangerous dynamic instabilities in the motion of a truck trailer. By unitizing loads, the shifting of the loads can be minimized during transport, and therefore damage to parts of the load resulting from bumping, as well as precarious vehicle dynamics, can be reduced.

In addition to payload damage and safety concerns, compliance with truck trailer weight distribution regulations necessitates the use of load-positioning structure. Truck trailers are typically limited, by law, to carry a payload of no greater than 48,000 lbs. This load must be distributed so that neither trailer axle is loaded in excess of 24,000 lbs. In order to maintain the weight distribution of a trailer load during transport, it is important to have the capability of unitizing and fixedly positioning the load.

One method which has been used is to place straps around the load, as shown in U.S. Pat. No. 1,920,917 to Scales. However, the structure disclosed in this patent for unitizing such loads is not readily adaptable to loads of different heights. The straps of such structure bear against the edges of the loads and thereby damage the loads.

Structure to prevent the shifting of a load in a moving vehicle is shown in U.S. Pat. Nos. 4,193,736 to Thomaswick.

Thomaswick discloses a pair of spaced deck runners, with a stanchion and lash bar attached to the runners adjustable along the length thereof. Loads are unitized and confined between the stanchion and lash bar. The Thomaswick structure is complicated and, to be effective, must have runners extending over the entire length of the load-supporting surface to which it is attached. Such a structure takes up valuable space in vehicles and, because of the weight, reduces payload.

Further, the stanchion in Thomaswick takes up a substantial amount of space lengthwise of the runners. In certain situations, it is impossible to incorporate the Thomaswick structure into a vehicle. For example, if the load extends to within approximately two feet of the rear wall of the carrying vehicle, bracing of the load against rearward shifting may be required. The Thomaswick structure would not fit in the allowed space. Further, by reason of the complicated nature of the Thomaswick structure, its manufacture is relatively involved and costly.

Still other structures have been used, such as airbags, to fill the empty spaces in a transport vehicle. However, these structures can be dangerous as they are placed in relatively high pressures and can sometimes force the transport vehicle doors open, striking nearby individuals. Still further, the airbags are expensive and difficult to use.

The present invention is directed toward overcoming one or more of the problems as set forth above.

SUMMARY OF THE INVENTION

In one aspect of the present invention, a collapsible bracing structure for bracing a load against shifting on a surface bearing the load is disclosed, including a pair of upright side frames extending longitudinally of the load-bearing surface and a plurality of elongated cross-braces each having opposite ends and extending laterally to the side frames to retain the side frames in an upright position. Manually operable, rotatable latches are provided for releasably attaching the opposite ends of each of the elongated braces to each of the side frames to define a rigid block having a bottom surface engaging the surface bearing the load and at least one upright load-engaging face.

In another aspect of the present invention, a method is provided for bracing a load against shifting wherein a trailer is provided with a pair of rectangular side frames and a plurality of elongated cross-braces having manually operable latches for releasably attaching the opposite ends of the braces to the side frames to define a rigid block.

One object of the present invention is to allow for loads to be unitized in all three dimensions so as to minimize the motion during transport.

Another object of the present invention is to provide a bracing structure which will not damage the load. Still another aspect of the present invention is to provide a bracing structure and method of installing the structure, which is simple to use.

Another object of the present invention is to secure trailer loads so as to comply with regulatory load distribution mandates.

The invention structure cooperates with the load-bearing surface to rigidly and positively brace a load. In one aspect of the invention, the structure has a number of U-shaped brackets to cooperatively prevent shifting and separation of the structure from the load-bearing surface.

The invention structure can be made principally from wood and is readily adaptable to conventional style moving vehicles, such as trucks, trains, etc. Each structure is simple to assemble on sight regardless of the location and size of the load within the carrying vehicle.

In one form, the elongate cross-braces have a plurality of notches for engaging the side frames.

In tight spaces, the structure can be slightly modified for space efficiency. The modified structure, according to the invention, comprises the aforementioned upright side frames and cross-braces which are cut to length depending on the amount of space available.

BRIEF DESCRIPTION OF THE DRAWINGS

Other features and advantages of the invention will be apparent from the following description taken in connection with the accompanying drawing wherein:

FIG. 5 is a top view of an upper cross-brace of the structure shown in FIG. 1;

FIG. 6 is a side view of the upper cross-brace shown in FIG. 5;

FIG. 7 is a bottom view of a lower cross-brace of the structure shown in FIG. 1;

FIG. 8 is a top view of the lower cross-brace shown in FIG. 7;

FIG. 9 is a side view of the lower cross-brace shown in FIG. 7;

FIG. 10 is a bottom view of a linking member utilized in one embodiment of the present invention;

FIG. 11 is a side view of the linking member shown in FIG. 10;

FIGS. 12-15 are perspective views of the structure shown in FIG. 1 at various stages of assembly;

FIGS. 18-20 are diagrammatic illustrations of the present invention in various applications;

FIG. 21 is an illustration of a bracket for securing the bracing structure shown in FIG. 1; and FIG. 22 is a side view of the alternative embodiment shown in FIGS. 16 and 17.

DESCRIPTION OF THE PREFERRED EMBODIMENTS

A collapsible bracing structure is shown generally at 10 as having a pair of spaced-apart side frames 12 and 14 connected by a number of elongated cross-braces 16 to define a rigid wood box 18 capable of unitizing and/or bracing a load in a manner as will be described.

Figure 3:
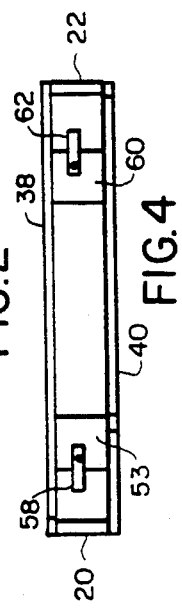
FIG. 3 is an end view of the side frame shown in FIG. 2.
Figures 2, 4:
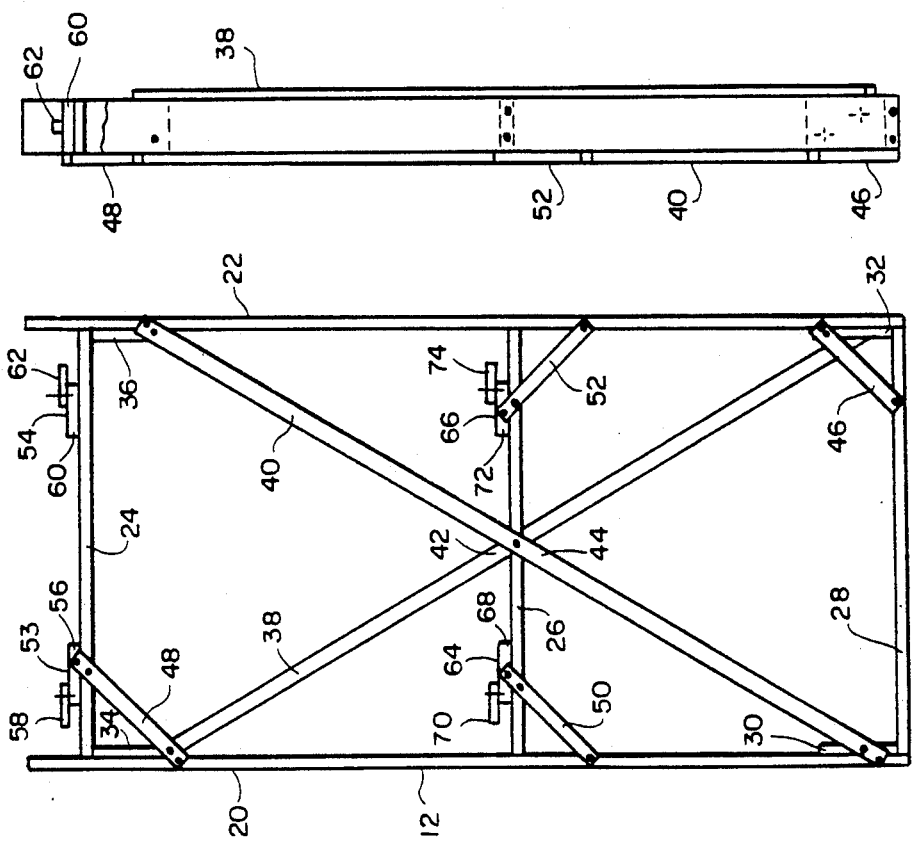
FIG. 2 is a side view of a side frame of the structure shown in FIG. 1.
FIG. 4 is a top view of the side frame shown in FIG. 2.

Side frames 12 and 14 are identical structures and will be, therefore, described with reference to, arbitrarily, side frame 12. It should be understood that the herein described components of side frame 12 are similarly disposed on side frame 14. Referring to FIGS. 2-4, side frame 12 comprises a rectangular structure having a pair of spaced-apart, upright legs 20 and 22 connected by transverse elements 24, 26 and 28. All fixed connections herein described comprehend the use of threaded fasteners, such as screws, but are not to be understood as being so limited and envision the use of nails, glue, or any other effective securement means.

A pair of lower reinforcement blocks 30 and 32 are fixed to the lower portions of upright legs 20 and 22, respectively, and act to reinforce the junctions of the upright legs with respective end portions of transverse elements 28. A pair of upper reinforcement blocks 34 and 36 are attached to upper portions of upright legs 20 and 22, respectively, and reinforce the junctions of the upright members with respective opposite ends of transverse element 24.

In addition to lower reinforcement blocks 30, 32 and upper reinforcement blocks 34, 36, side frame 12 has additional stiffening means in the form of angled stiffeners. A pair of full length stiffeners 38 and 40 are mounted on opposing faces of side frame 12. Full length stiffener 38 is attached at one end to upper reinforcement block 34, is fastened at a central portion 42 to transverse element 26, and is attached at an opposite end to lower reinforcement block 32. Full length stiffener 40 is attached at one end to upper reinforcement block 36, attached at a central portion 44 to transverse element 26, and fixed at an opposite end to lower reinforcement block 30. A number of additional angled stiffeners are provided to enhance the rigidity of side frame 12. Angled stiffener 46 extends between transverse element 28 and lower reinforcement block 32. Angled stiffener 48 extends between transverse element 24 and upper reinforcement blocks 34. Angled stiffener 50 extends between upright leg 20 and transverse element 26. Angled stiffener 52 extends between upright leg 22 and transverse element 26. Together, the reinforcement blocks 30, 32, 34 and 36, together with stiffeners 38, 40 and 46, 48, 50 and 52 provide a rigid frame capable of withstanding excessive forces.

A pair of manually operable latches 53 and 54 are fixed to upper transverse element 24. Latch 53 comprises a spacer block 56 interconnecting a rotatable lock 58 to the side frame 12. Symmetrically spaced latch 54 includes a spacer block 60 and a rotatably mounted block 62. A pair of similar manually operable latches 64 and 66 are mounted on transverse element 26. Latch 64 has a spacer block 68 and a rotatable lock 70. Latch 66 has a spacer block 72 and a rotatable lock 74. Each of the rotatable locks 58, 62, 70 and 74 is pivotally fixed to the corresponding spacer block 56, 60, 68 and 72 by means of a threaded fastener interengaging each pair of corresponding elements. The fastener is advanced to a point at which the rotatable locks are frictionally engaged with the corresponding spacer blocks, but may be positioned easily by an individual.

Figure 1:
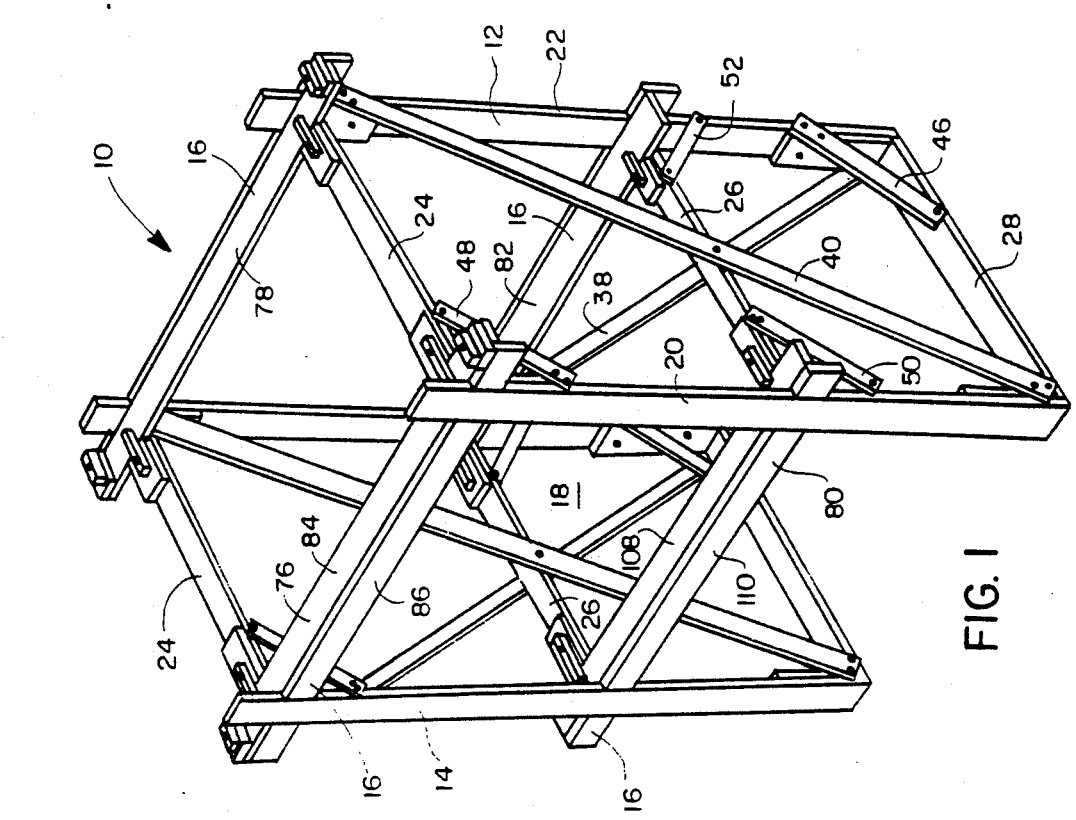
FIG. 1 is a perspective view of a structure embodying the present invention.

As shown in FIG. 1, side frames 12 and 14 are spaced apart by elongated cross-braces 16. Upper cross-braces 76 and 78 engage the upper transverse element 24 of opposed side frames 12 and 14. Intermediate cross-braces 80 and 82 extend between the center transverse elements 26 of spaced-apart side frames 12 and 14. In manner described below, the cross-braces 76 and 78 engage manually operable latches 53 and 54, respectively, and intermediate cross- braces 80 and 82 engage manually operable latches 64 and 66, respectively.

Upper cross-braces 76 and 78 comprise similar structures and will herein be described with reference to, arbitrarily, upper cross-brace 76. Cross-brace 76 is an elongated L-shaped member having an top flange 84 and a perpendicular side flange 86 with a pair of spaced-apart notches 88. Each notch 88 is flanked by a pair of reinforcement blocks 90 on the underside of top flange 84 to reinforce the junction of the side flange 88 and top flange 84. A manually operable latch 92, comprising a spacer block 94 and rotatable lock 96, is mounted on an end 98 of the top flange 84, and a manually operable latch 100, comprising a spacer block 102 and rotatable lock 104, is mounted on an opposite end 106 of top flange 84.

Intermediate cross-braces 80 and 82 are similar structures and will be described herein with reference to, arbitrarily, cross-brace 80. Cross-brace 80 is an elongated L-shaped member having a top flange 108 and a perpendicular side flange 110 with a pair of oppositely spaced notches 112. Each of notches 112 is flanked by a pair of reinforcement blocks 114 for reinforcing the junction of top flange 108 and side flange 110.

The method of assembling the side frames 12 and 14 and cross-braces 76, 78 and 80, 82 will now be described. Referring to FIGS. 12-15, the side frames 12 and 14 are first arranged in a parallel spaced arrangement and extending longitudinally with respect to a trailer. Upper cross-brace 76 is first installed by placing the brace downward over the upper transverse elements 24 of the side frames in a direction shown by arrow 116. Notches 88 on side face 86 engage an upper end portion of upright leg 20 of side frames 12 and 14. A space 118 formed between reinforcement blocks 90 receives an end portion of upper transverse elements 24. Once the notches of cross-brace 76 are fully interlocked with each side frame, rotatable locks 58 are manually pivoted to engage a portion of top surface 84 and lock upper cross-brace 76 in place.

Intermediate cross-brace 80 is next locked into place. Cross-brace 80 is forced downwards in the direction of arrow 120 over end porticos of transverse elements 26. Notches 112 engage a portion of upright legs 20 of side frames 12 and 14, while spaces 122, formed between each pair of reinforcement blocks 114, are seated on end portions of transverse elements 26. Once the notches on intermediate cross-brace 80 are fully seated on side frames 12 and 14, rotatable locks 70 are pivoted to engage top surface 108 of cross-brace 80.

In a similar manner, upper cross-brace 78 is forced downwardly in the direction of arrow 124 to engage side frames 14 and 12. Rotatable locks 62 are then rotated to engage top surface 84. Intermediate cross-brace 82 is then forced downwardly in the direction of arrow 126 over end portions of transverse elements 26. Rotatable locks 104 are then pivoted to engage top surface 108 of the cross brace.

With this arrangement, an easily installed, rigid unitizer/brace structure may be installed within a truck trailer to separate a payload, as shown in FIGS. 18-20. In FIG. 18, the invention functions as a unitizing structure 128 positioned between end portions 130 and 132 of a truck payload. The structure 128 comprises a pair of opposed load-engaging faces 134 and 136 and a bottom surface 138 engaging the load-bearing surface 140 of a truck trailer. FIG. 19 illustrates a similar embodiment in which a second bracing structure 130 is provided at the rear of payload 132. With this arrangement, payload portions 130 and 132 are unitized, and payload 132 is prevented from shifting rearward and separating from load-bearing surface 140. A U-shaped bracket 142 is placed against the upright side frames 12 and 14 and is attached to the load-bearing surface 140 by means of nails or threaded fasteners to keep the side frames from separating from the load-bearing surface.

An alternative embodiment is shown in FIG. 20 wherein a number of structures 144 are laterally spaced in a longitudinally extending arrangement within a truck trailer to position a payload of flat materials 146, such as sheet steel.

Figure 16:
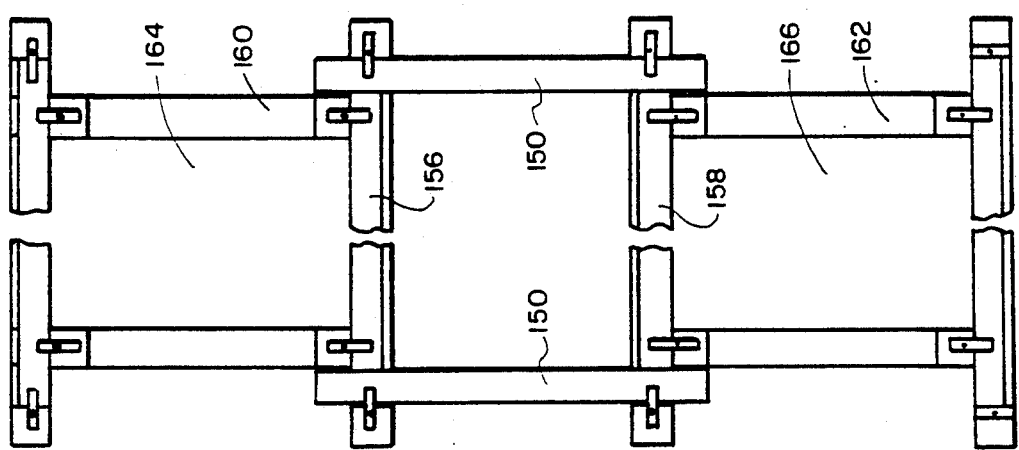
FIGS. 16 and 17 are top views of an alternative embodiment of the present invention.
Figure 15:
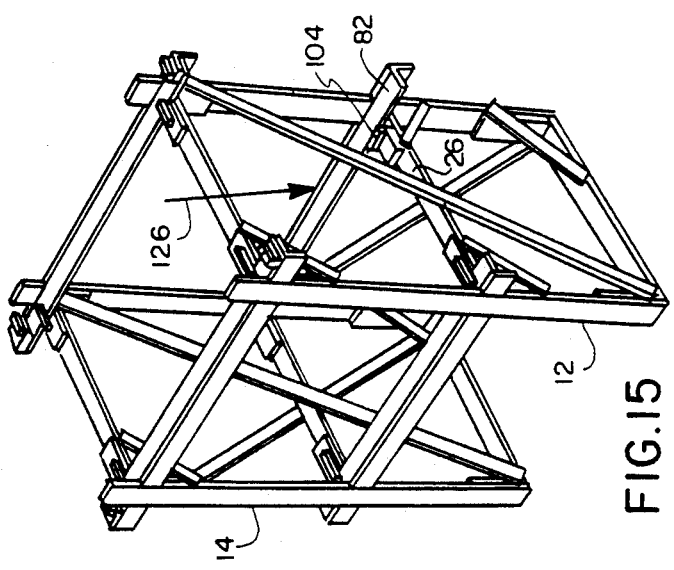
Figure 14:
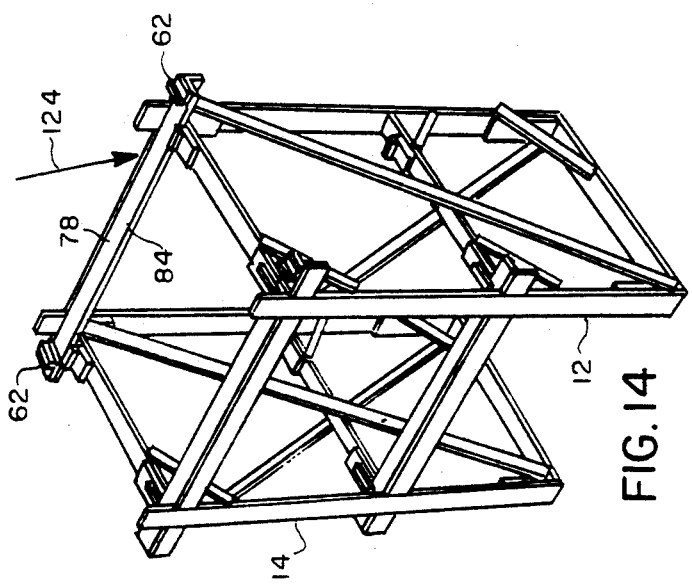
Figure 17:
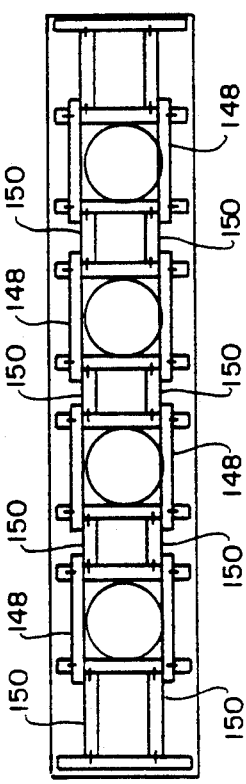

In a preferred embodiment and as shown in FIG. 16, 17 and 22, the present invention is adapted to brace a plurality of discrete loads. A number of rigid blocks 148 are joined by means of elongated link members 150 each having a pair of oppositely spaced pairs of spacers 152 defining end notches 154 therebetween. Referring to FIG. 16, link members 150 engage adjacent upper crossbraces 156 and 158 to join rigid blocks 160 and 162 formed according to the present invention. The blocks 160 and 162 define interior cavities 164, 166 which are adapted to carry discrete loads, such as cylindrical rolls of paper. FIG. 17 shows the bracing strucure arranged seriatim for four rolls of paper each to be confined between linking members 150 so as to restrain the upper portion of the rolls against tipping and movement.

The above described invention provides a unitizing and bracing structure affording many advantages over existing devices. The apparatus is useful in equalizing the load between a pair of truck trailer axles as well as for avoiding the dangerous shifting of loads within a truck trailer. The device is versatile and can be used on each of the opposite ends of the load, intermediate the ends of the load and at the sides of the load. The device can be assembled and dismantled in a few minutes without any tools and is designed for reuse a multiplicity of times. The dismantled device can be stored in a very small space in the nose of the trailer to accommodate future loads. The device can be varied in height easily to accommodate loads of varying height. Except for the opposite side frame portions, the remaining components are interchangeable so that the cross-braces can be used with any number of side frames of varying heights. Because for a given customer the size of the trailer, the axle positions, and the type of loads to be carried are known quantities, the side frames can be appropriately sized to properly distribute the weight about the axles.

I claim:

1. A collapsible bracing structure for bracing a load against shifting on a surface bearing the load, the collapsible bracing structure comprising:

a pair of laterally spaced frames extending in parallel on the load bearing surface, each frame having a pair of upright members connected by a plurality of vertically spaced transverse members;

an elongated cross brace extending between the frames and releasably connected therewith to define a rigid parallelepiped for bracing a load, the cross brace being a generally L-shaped member having a substantially horizontal leg and a substantially vertical leg, said substantially horizontal leg contacting and resting on a transverse member on each frame when the bracing structure is assembled, said substantially vertical leg having a first notch engaged with one of the upright members of one side frame and a second notch engaged with one of the upright members of the other side frame whereby each upright member engaged with the substantially vertical leg fits within the corresponding notch to prevent lateral separation of the side frames; and a latch on at least one of the side frames and movable into overlying engagement with the substantially horizontal leg for maintaining engagement of the cross brace with the upright members.

2. The collapsible bracing structure of claim 1 in which the latch is connected to a transverse member on one of the side frames.

3. The collapsible bracing structure of claim 2 in which the latch is pivotally connected to the transverse member.

4. The collapsible bracing structure of claim 3 in which a spacer block is interposed between the latch and the transverse member and abuts the one leg of the cross brace resting on the transverse member to maintain engagement of one of the notches on the other leg with a corresponding upright member.

5. In combination with a plurality of collapsible bracing structures according to claim 1, means for releasably connecting a pair of said structures when a pair of said structures are adjacently posed including, an elongated link extending between the structures and a manually operable latch on each structure for uniting the link therewith.

6. The combination of claim 5 in which the elongated link has a first notch engaged with the cross brace of one bracing structure and a second notch engaged with the cross brace of an adjacent bracing structure.

* * * * *